United States Patent Office 3,484,224
Patented Dec. 16, 1969

3,484,224
METHOD OF CHEMICALLY STRENGTHENING GLASS
Neil Hunter Ray and Samuel John Webster, Northwich, England, assignors to Imperial Chemical Industries Limited, London, England, a corporation of Great Britain
No Drawing. Filed May 13, 1966, Ser. No. 549,797
Claims priority, application Great Britain, June 1, 1965, 23,356/65
Int. Cl. C03c 15/00
U.S. Cl. 65—30                                    3 Claims

ABSTRACT OF THE DISCLOSURE

Glass, particularly ordinary soda/lime glass is strengthened, without the development of any yellow color, by a process of etching and cation-exchange in melt-systems, the cation-exchange, silver for sodium, taking place in systems containing silver ions and other cations in which at least 90% of the total cations are sodium ions. In the one-stage process the melt-system preferably comprises sodium nitrate, sodium borofluoride and silver nitrate at a temperature of 350° C. to 450° C. and the glass is immersed for 15 to 90 minutes. In a two-stage variation the first stage is to etch in a melt at preferably 375° C. to 425° C. containing borofluorides and nitrates of sodium or potassium, and the second is to replace sodium ions in the glass with silver ions by immersion of the etched glass in a sodium nitrate melt, at preferably 300° C. to 350° C., containing from 0.5% to 5.0% by weight of silver ions the latter having been added as metallic silver or as silver nitrate.

---

This invention relates to a process for strengthening glass by a chemical treatment involving an etching treatment and an ion-exchange treatment in which cations in the surface of the glass undergo exchange with cations in a molten salt bath.

A process of this type has been described in which the glass is etched in a molten salt bath containing an etching agent and subjected to cation-exchange by the action of a molten salt whose cations, for example potassium ions, are larger than those in the surface of the glass, for example sodium ions. In this process it is advantageous to add a minor proportion, for example 0.50 to 10% by weight, of silver to the molten salt responsible for the cation-exchange, either as the metal, which dissolves in the molten salt, or as a silver salt for example the nitrate. The incorporation of silver is advantageous in that it increases strength, but it can have disadvantages in that silver ions entering the glass can in the course of the treatment become reduced to metallic silver which tends to aggregate to form colloidal particles in the surface of the glass. These give a yellow colour to the latter which is undesirable for some applications.

We have now found that this yellow colour can be avoided if instead of potassium salts, or other salts yielding larger cations than sodium ions, for cation-exchange and for dissolving the silver or silver salt one uses sodium salts or a mixture of salts in which at least 90% of the cations are sodium ions. It is not known why this should be; it could be because silver ions are not under such conditions reduced to metallic silver, or if they are reduced it could be that the particles do not aggregate into colloidal particles.

Thus according to the general form of our invention we provide a process for strengthening glass comprising subjecting the glass to the action of at least one etching agent, as hereinafter defined, dissolved in at least one molten salt, and also to the action of a melt containing silver ions in which at least 90% of the cations are sodium ions whereby ion-interchange takes place between cations in the surface of the glass and said silver ions.

The process can be carried out in two separate stages using two separate melt-systems in the first of which etching takes place and in the second cation-exchange takes place. It can also be carried out in one stage using one melt-system in which etching and cation-exchange occur together.

Thus according to one particular form of our invention a process for strengthening glass comprises in a first stage subjecting the glass to the action of at least one etching agent as hereinafter defined dissolved in at least one molten salt, removing the glass from the melt and subjecting it in a second stage to the action of a salt melt-system containing silver ions and in which at least 90% of the cations are sodium ions.

According to another particular form of our invention a process for strengthening glass comprises subjecting the glass to the action of a salt melt-system containing at least one etching agent as hereinafter defined and silver ions, and in which at least 90% of the cations are sodium ions.

For the purpose of this specification an etching agent is defined as a substance that can remove a thin uniform layer from the glass under the conditions of the process and not give rise to hydrogen ions or other ions having a greater affinity for the glass than cations in the melt-system in which the agent is dissolved. Etching agents as defined include sodium and potassium borofluorides, sodium and potassium fluorides, ammonium fluorosulphonate and silver fluoride, of which the borofluorides are particularly effective and may be used alone or in combination subject to the conditions of the process regarding the proportions of sodium ions in the melt-systems.

In the two-stage form of the process the etching agent used in the first stage is preferably sodium borofluoride or potassium borofluoride or a mixture of these and is dissolved in a molten salt preferably sodium nitrate or potassium nitrate or a mixture of the two in such amount that the concentration of the etching agents in the melt as a whole is from 5 to 50% by weight. The temperature of the melt-system generally lies between 250° C. and 450° C., preferably from 375° C. to 425° C., and the time of immersion of the glass in the system is from 2 to 60 minutes and usually from 10 to 15 minutes. In the second of the two stages the molten salt must be such that at least 90% of the cations in it are sodium ions, for example sodium nitrate alone, or sodium nitrate and sodium borofluoride. In this melt-system of the second stage there is from 0.5 to 5.0% by weight of silver, expressed as Ag, added either as the metal or as a silver salt preferably the nitrate. The temperature of the melt-system is from 200° C. to 400° C. and is preferably somewhat lower than that of the etching melt of the first stage, for example from 300° C. to 350° C. The time of immersion of the glass is from 5 to 90 minutes, the longer times being necessary at the lower temperature.

In the one-stage form of the process the melt-system preferably comprises sodium nitrate and sodium borofluoride, the proportion of the latter being from 5 to 50% by weight of the system as a whole, together with an amount of silver, added either as the metal or as silver nitrate, such that the proportion, expressed as Ag, is from 0.5 to 5.0% by wieght of the melt-system as a whole. Minor amounts of potassium salts may be present, provided that at least 90% of total cations present are sodium ions. The temperature is from 250° C. to 450° C., preferably from 350° C. to 450° C. and the time of immersion of the glass from 15 to 90 minutes.

The process in either its two-stage or one-stage form can also be used as a tempering and strengthening treatment for sheet glass. For this the glass is pre-heated to a temperature just short of its softening point, that is to 600°–700° C. and then rapidly cooled in the etching melt of the two-stage process, after which it is subjected to the action of this melt and then to the action of the melt of the second stage as hereinbefore described, or it is rapidly cooled in the melt of the one-stage process and thereafter subjected to its action as hereinbefore described.

The process of the invention is applicable to sheet glass, and glass rods, tubes and containers and produces a strong, colourless glass, which even after severe abrasion, has a tensile strength from four to five times that of the corresponding untreated glass.

The invention is illustrated by Examples 1 to 5, whilst Example 6 illustrates its application in a combined tempering and strengthening process.

Example 1

Glass rods 10 cms. long and 4 mms. diameter made from a glass containing 71.9% $SiO_2$, 1.66% $Al_2O_3$, 13.92% $Na_2O$, 8.43% CaO, 1.47% BaO, 0.63% MgO and 1.19% $K_2O$ were immersed in batches of eight at a time in molten sodium nitrate containing different amounts of sodium borofluoride and silver added as metal.

After treatment the rods were cooled, washed, and dried and all were found to be colourless. Two or more of the batch were abraded by rolling together for half a minute inside a roughened cylinder revolving 100 times per minute. After this their ultimate strengths in flexure were determined by a 4-point bend test.

The strengths of any unabraided rods in each batch were similarly determined. In some experiments all eight rods were subjected to abrasion. The results of these determinations are given in Table 1. The average ultimate flexural strength of untreated glass rods of the same composition and dimensions was 16,000 lb./sq. inch.

TABLE 1

| Melt composition, wt. percent | | | Time, min. | Temp., °C. | Average ultimate flexural strength | |
|---|---|---|---|---|---|---|
| $NaNO_3$ | $NaBF_4$ | Ag | | | Before abrasion, lb./sq. in. | After abrasion, lb./sq. in. |
| 58 | 40 | 1.6 | 15 | 450 | 148,000 | 81,000 |
| 58 | 40 | 1.6 | 90 | 350 | 142,000 | 78,000 |
| 58 | 40 | 2.0 | 50 | 400 | 127,000 | 60,000 |
| 78 | 20 | 3.4 | 60 | 350 | 130,000 | 68,000 |

Example 2

Glass rods of the same composition and dimensions as those described in Example 1 were immersed for 30 minutes at 400° C. in a molten mixture containing 60% and 40% by weight respectively of sodium nitrate and sodium borofluoride. They were removed from the melt and then immersed for 30 minutes at 350° C. in a mixture consisting by weight of 78.3% sodium nitrate, 18.3% sodium borofluoride and 3.4% silver added as metal. The rods were colourless and the average ultimate flexural strengths before and after abrasion as described in Example 1 were respectively 127,000 and 53,000 lb./sq. inch.

Example 3

Glass rods of the same composition and dimensions as those described in Example 1 were immersed for 30 minutes at 400° C. in a molten mixture containing 60% and 40% by weight respectively of sodium nitrate and potassium borofluoride. They were removed from the melt and then immersed for 30 minutes at 350° C. in a molten mixture consisting by weight of 78.3% sodium nitrate, 18.3% sodium borofluoride and 3.4% silver added as metal. The rods after treatment were colourless and had average ultimate flexural strengths of 146,000 lb./sq. inch before abrasion and 66,000 lb./sq. inch after abrasion.

Example 4

A single molten salt bath was prepared from 960 lb. of sodium nitrate and 240 lb. of sodium borofluoride heated electrically in a tank constructed from 0.375 inch nickel sheet 3 feet long, 1 foot wide and 3 feet deep. Sheet silver was dissolved in the melt in different amounts and batches of 25 to 30 sheets of glass 0.11 inch thick and 2 feet square were treated at 340° C. After treatment the sheets were cooled, washed in water and subjected to an impact test. In this test a sheet is supported horizontally in a wooden frame with a 0.25 inch rebate and a steel ball weighing 225 g. dropped from an electromagnet on to its centre. Table 2 shows the results obtained; the height of drop being the average for each batch of 25 to 30 sheets. Untreated sheets fractured with an average drop of 3.25±0.8 feet.

TABLE 2

| Bath composition, wt. percent | | | Treatment time (min.) | Height of drop (ft.) |
|---|---|---|---|---|
| $NaNO_3$ | $NaBF_4$ | Ag | | |
| 79 | 20 | 0.7 | 10 | 4.8±0.5 |
| 79 | 20 | 0.7 | 30 | 5.7±0.5 |
| 78 | 20 | 1.6 | 10 | 5.6±0.7 |
| 78 | 20 | 1.6 | 30 | 6.8±0.5 |
| 78 | 20 | 2.4 | 10 | 5.5±0.7 |
| 78 | 20 | 2.4 | 30 | 6.2±0.6 |

Example 5

Batches of 25–30 sheets of glass 0.11 inch thick and 1 foot square were treated for various times at 340° C. in the melt described in Example 4 containing 2.4% by weight of silver. Their strengths were subsequently measured by a static loading test in which using a "Denison" tensometer a ball bearing 1 cm. in diameter was pressed on to the centre of the glass sheet resting over a circular aperture 25 cms. in diameter in a rigid steel block covered with a thin rubber sheet. The force required to fracture the glass was measured by the tensometer. The geometry of the latter made it impossible to apply this convenient and reproducible test to sheets larger than 1 foot square. The results are shown in Table 3.

TABLE 3

| Treatment time, minutes | Breaking load, tons |
|---|---|
| 0 | 0.05±0.01 |
| 10 | 0.10±0.02 |
| 30 | 0.21±0.09 |
| 60 | 0.23±0.06 |
| 120 | 0.25±0.07 |

Example 6

Glass sheets 6" square and ¼" thick were preheated to 700° C. in a furnace for 20 minutes, and then lowered rapidly into a molten salt bath held at 380° C. and containing by weight 78.3% sodium nitrate, 18.3% sodium borofluoride, and 3.4% silver added as metal. The sheets were agitated in this bath for 10 minutes and then removed, cooled to room temperature during 30 minutes, and then washed with warm water until all adhering salts were removed.

The sheets were colourless and remained intact after dropping a steel ball weighing 225 grams from a height of 5 feet; similar untreated glass sheets broke when the steel ball was dropped from 2 feet.

What we claim is:

1. In a process for strengthening glass by etching the glass and subjecting the glass to cation exchange with ions in a molten salt, which ions in the molten salt are larger than the ions in the surface of the glass, the improvement comprising preventing the glass from yellowing in the process by contacting the glass at a temperature between 250°–450° C. with a salt melt-system consisting essentially of sodium nitrate, 0.5% to 5% silver nitrate and 5% to 50% of an etching agent selected from sodium fluoride and sodium borofluoride, all percentages being by weight and the silver nitrate calculated as Ag.

2. A process as claimed in claim 1 wherein 20% to 40% of the etching agent is in the salt melt-system.

3. A process as claimed in claim 1 in which the glass is pre-heated to just below its softening point prior to contacting the glass with the said salt melt system.

References Cited

UNITED STATES PATENTS 2,647,068    7/1953    Patai _____ 117—35
3,317,297    5/1967    Ray _____ 65—30

OTHER REFERENCES

Kistler: "Stresses in Glass Produced by Non-Uniform Exchange of Monovalent Ions," J. of Amer. Cer. Soc., vol. 45, No. 2, February 1962, pp. 59–68.

S. LEON BASHORE, Primary Examiner
JOHN H. HARMAN, Assistant Examiner

U.S. Cl. X.R.
65—31; 156—24